Nov. 10, 1936.  C. BUTLER  2,060,026
HOOD CLAMPING DEVICE
Filed April 17, 1934
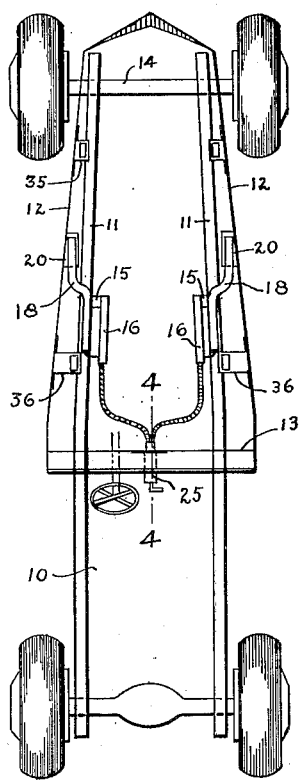
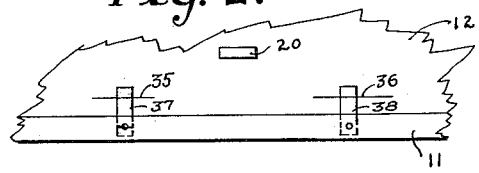
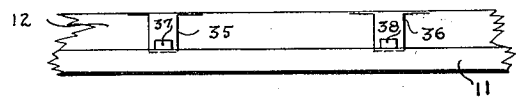
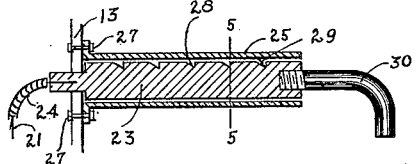
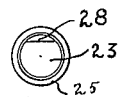
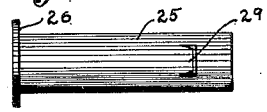
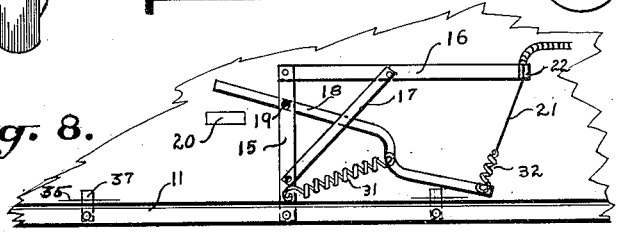
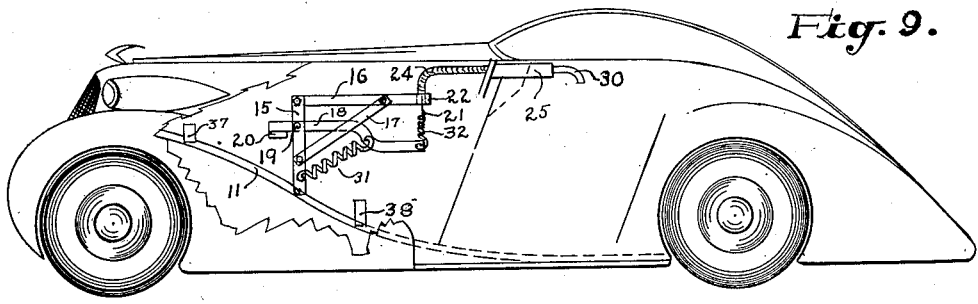
INVENTOR.
CLAUDE BUTLER
BY
ATTORNEYS.

Patented Nov. 10, 1936

2,060,026

UNITED STATES PATENT OFFICE 2,060,026

HOOD CLAMPING DEVICE

Claude Butler, Los Angeles, Calif.

Application April 17, 1934, Serial No. 720,957

3 Claims. (Cl. 292—229)

This invention relates to means for fastening or clamping the hood of an automobile, and finds particular utility as a method of protecting the car and certain parts thereof against possible theft. The usual and customary manner of clamping an automobile hood in closed position is to provide a device or mechanism operated from outside of the hood, whereas my invention comprehends a device that is located inside the hood and operated from inside the car by any person seated therein.

It is an object of my invention to provide a device for clamping the hood of an automobile which is positioned inside of the hood so as not to be susceptible to efforts to open the hood from the outside.

It is a further object of my invention to provide such a clamping device which is operated and controlled by a handle or other means located inside of the car and preferably on or adjacent to the dash board.

It is also an object of my invention to provide a hood clamp which will be positive and sure in its action and which will consequently prevent any rattle or noise from the hood when clamped.

It is also an object of my invention to provide a hood clamping device of the character described which can be easily and quickly installed in cars and which will not be cumbersome or a hindrance in any way to easy access to the motor and other parts under the hood.

It will be apparent that such a device will have great utility in safeguarding the car and the engine, for when the door of a closed car is locked, it becomes impossible for anyone to get at the engine without first obtaining access to the inside of the car.

These and other objects and advantages of my invention will be evident from the following description of a preferred form of my invention and from an inspection of the accompanying drawing in which:

Fig. 1 is a skeletonized plan of an automobile chassis with my device installed.

Fig. 2 is a fragmentary vertical section of the lower portion of one side of the hood.

Fig. 3 is a plan view corresponding to Fig. 2.

Fig. 4 is a fragmentary section taken at 4—4 in Fig. 1.

Fig. 5 is a section taken at 5—5 in Fig. 4.

Fig. 6 is a plan view of the barrel of Fig. 4.

Fig. 7 is an end view corresponding to Fig. 6.

Fig. 8 is a side elevation of the clamping device in open position.

Fig. 9 is a side elevation of the whole device installed in a car, the device being in closed or clamped position and drawn to an exaggerated scale.

Referring now to the drawing, the numeral 10 designates the chassis of an automobile of usual type which is provided with a frame 11, hood 12, and dash board 13. Rigidly fastened to one side of the frame 11 at any convenient point between the dash board 13 and the front axle 14 is an upstanding post 15 made of suitable material as for instance cast iron, steel, or duraluminum. As will be noted from Figs. 1 and 9, I prefer to locate the post 15 a little closer to the dash than to the front axle, although this is not essential.

Extending horizontally from the top of post 15 is supporting arm 16. This supporting arm can be formed in one piece with the post 15, can be fastened thereto at one end, or can be formed as an L-shaped bracket and bolted or otherwise fastened to the post 15. I find this last method very simple and efficient and it can be accomplished by bolting or riveting one leg of the L to the post 15, the other leg of the L forming the arm 16 which I prefer to brace by the use of diagonal cross-brace 17.

A movable lever arm, which we will term the clamping arm or rocker 18, is pivoted at 19 on post 15 at some point conveniently above the frame 11. The rocker 18 moves from a substantially horizontal position when at one end of its movement to an inclined position at the other end of its movement. The free end of the rocker 18 is adapted to engage a lug 20 carried on the inside of hood 12 and so positioned that when the hood 12 is lowered into closed position, the lug 20 will be substantially the same height as the pivot 19 on post 15. In Fig. 8 the rocker 18 is out of engagement with lug 20, whereas in Fig. 9 they are in engagement or locked position. It will be seen that when rocker 18 is held in horizontal position in engagement with lug 20, the hood 12 cannot be raised.

Fastened to the other end of the rocker 18 is a wire, chain or other connecting means 21, which leads upwardly from the rocker 18 through a supporting bracket or clamp 22 on the end of supporting arm 16 and thence to an opening in the dash board through which the locking rod 23 extends. If desired, the wire 21 may be housed in a flexible tube 24 as illustrated in the drawing. While I show a flexible tension connecting means, it will be understood that rod means could be used consisting either of a single rod leading directly to the dash board, or a jointed rod following the same general path as shown for my wire 21.

As shown best in Figs. 4, 5, 6 and 7, the locking rod 23 is slidably housed in a tube or barrel 25 extending horizontally from the dash board 13 and fastened thereto by any convenient means such as flange 26 and bolts 27. The upper segment of the rod 23 is provided with a series of notches 28. A spring catch or pawl 29 to engage the notches 28 can be formed by making a U cut in the upper face of barrel 25 and bending the section thus formed down to ride on the rod 23, or can be made by fastening a spring clip inside of the barrel 25 to ride on rod 23.

It will be seen then that when the rod 23 is pulled out of the barrel 25 as by grasping the handle 30, the pawl 29 will snap down into successive notches to hold the rod 23 against counter movement induced by the force of spring 31 extending between the base of post 15 and the middle or end portion of clamping arm 18. To take up whatever slight amount of slack may develop in the wire 21 or whatever mis-adjustment may arise, I provide a relatively heavy spring 32 in the wire 21 so that if the rocker 18 seats on lug 20 when pawl 29 is between notches, a slight stretch of the spring 32 will permit pawl 29 to seat in the next succeeding notch to insure a tight contact between rocker arm 18 and lug 20.

When it is desired to release the rocker 18 to open the hood, the handle 30 is merely turned in either direction to cause the notches to rotate out of the plane of the pawl 29, thus allowing the locking rod to slide back into the barrel 25 by reason of the spring 31; which movement causes the rocker arm 18 to rise out of contact with lug 20 and release the hood so that it can be opened.

Referring now particularly to Figs. 2 and 3, which show segments of the hood 12 and frame 11, the numerals 35 and 36 designate U shaped clips fastened to the inside of the hood 12 and adjacent the ends thereof. The central portion of these clips is spaced away from the hood to allow the passage therethrough of prongs 37 and 38 respectively. These prongs 37 and 38 are fastened to the frame and project upwardly therefrom a short distance sufficient that when the hood 12 is lowered into closed position, the prongs 37 and 38 will pass up through the clips 35 and 36 and hold the hood against any lateral movement.

In that most cars are now built with the hood in two parts, one section closing down on each side of the engine, I have illustrated my invention in Fig. 1 as adapted to this form of car. However, as the device and construction of each side is identical, I have deemed it necessary to describe my invention in detail as to one side of the hood only.

The construction shown is particularly applicable to closed cars such as sedans, coupes and the like, which can be securely locked. For my device to perform the same function of safeguarding the motors of open cars, it will, of course, be necessary to provide lock means on the handle 30 or rod 23. Many suitable types of locks are suitable for this use, the particular kind adaptable forming no part of my invention.

It will be evident from the foregoing that I have provided a device of great utility and while the preferred form of my invention shown and described is fully capable of performing the objects and attaining the advantages mentioned, it is meant to be illustrative only and not limiting for I realize that numerous modification thereof will be necessary in adapting my invention to different styled automobiles. Likewise, various equivalent means for performing the several functions of my device will occur to those skilled in the art, all of which are properly comprehended in the full breadth of my invention as defined by the scope of the appended claims.

I claim as my invention:

1. An automobile hood clamping device comprising in combination: an upstanding post supported upon the frame of said automobile and inside said hood; a substantially horizontal arm rigidly fastened to the upper end of said post; a rocker pivoted to said post and extending laterally thereof and adapted to rotate in a substantially vertical plane; a spring attached to one end of said rocker; tension means attached to said spring and extending up into the driver compartment of said automobile, said tension means being guided by a bracket on the outer end of said horizontal arm; said tension means being adapted to rotate the other end of said rocker downwardly to a substantially horizontal position to engage a portion of said hood and hold the same firmly against vertical movement; and means for locking said tension means and said rocker in said position.

2. An automobile hood clamping device comprising in combination: an upstanding post supported upon the frame of said automobile and inside said hood; a substantially horizontal arm rigidly fastened to the upper end of said post; a rocker pivoted to said post and extending laterally thereof and adapted to rotate in a substantially vertical plane; a spring one end of which is attached to the base of said post the other end being attached to said rocker adjacent one end thereof and exerting a downward pressure on said end; a spring attached to one end of said rocker; tension means attached to said spring and extending up into the driver compartment of said automobile, said tension means being guided by a bracket on the outer end of said horizontal arm; said tension means being adapted to rotate the other end of said rocker downwardly to a substantially horizontal position to engage a portion of said hood and hold the same firmly against vertical movement; and means for locking said tension means and said rocker in said position.

3. An automobile hood clamping device comprising in combination: an upstanding post supported upon the frame of said automobile and inside said hood; a rocker pivoted to said post and extending laterally thereof and adapted to rotate in a substantially vertical plane; a spring one end of which is attached to the base of said post the other end being attached to said rocker adjacent one end thereof and exerting a downward pressure on said end; a spring attached to one end of said rocker; tension means attached to said spring and extending up into the driver compartment of said automobile, said tension means being adapted to rotate the other end of said rocker downwardly to a substantially horizontal position to engage a portion of said hood and hold the same firmly against vertical movement; and means for locking said tension means and said rocker in said position.

CLAUDE BUTLER.